US 7,953,576 B2

(12) United States Patent
Reddy et al.

(10) Patent No.: US 7,953,576 B2
(45) Date of Patent: May 31, 2011

(54) APPARATUS TO PREDICT FAN WEAR-OUT AND IMPENDING FAILURE AND METHOD OF MANUFACTURING THE SAME

(75) Inventors: Raghothama Reddy, Murphy, TX (US); Mark A. Haisler, Dallas, TX (US)

(73) Assignee: Lineage Power Corporation, Mesquite, TX (US)

( * ) Notice: Subject to any disclaimer, the term of this patent is extended or adjusted under 35 U.S.C. 154(b) by 372 days.

(21) Appl. No.: 12/250,610

(22) Filed: Oct. 14, 2008

(65) Prior Publication Data
US 2010/0094593 A1    Apr. 15, 2010

(51) Int. Cl.
*G08B 21/00* (2006.01)

(52) U.S. Cl. .................................................. 702/183
(58) Field of Classification Search ................... 702/183
See application file for complete search history.

(56) References Cited

U.S. PATENT DOCUMENTS
2005/0165577 A1* 7/2005 Fasullo et al. ................. 702/142
* cited by examiner

*Primary Examiner* — Tung S Lau

(57) ABSTRACT

An apparatus for predicting fan wear-out and impending failure and a method of manufacturing the same. One embodiment provides for (1) a lookup table containing expected fan speeds at given duty cycles; and (2) a processor for comparing a measured fan speed at a given duty cycle with an expected fan speed at the given duty cycle, the processor generating a predicted fan wear-out and impending failure.

20 Claims, 3 Drawing Sheets

APPARATUS TO PREDICT FAN WEAR-OUT AND IMPENDING FAILURE AND METHOD OF MANUFACTURING THE SAME

TECHNICAL FIELD OF THE INVENTION

The present invention is directed, in general, to a fan warning device and, more specifically, to a device for predicting fan wear-out and impending failure.

BACKGROUND OF THE INVENTION

Although a number of devices and mechanisms are available for use in the dissipation of heat generated by electronic and mechanical devices, one of the most effective is a simple fan. The fan is generally positioned on or near the device in a manner that will dissipate heat generated by the device into the surrounding ambient air. In recent years, electronic devices have become more and more compact, which means that fans being used for the transfer of heat away from the device circuitry have also become very small. On the other hand, other mechanical or electronic devices may be very large, requiring large fans for heat control. In some cases a cooling fan will be dedicated to the removal of heat from a single device or circuit, while at other times a fan, or fans, will be used to remove heat generated by a plurality of devices circuits. In each of the foregoing cases, a fan failure may be critical.

Because heat is one of the primary causes of electrical component failure, if a cooling fan fails there is a substantial risk that a component in a device will fail or, at the very least, the device's useful life will be shortened considerably. Of course, if a component fails, the entire device is also at risk of failure. Thus, an apparatus, mechanism or device to predict fan wear-out and impending failure is important from a maintenance point of view.

At present the most prevalent practice in dealing with a fan failure is to do nothing until the fan actually fails or it is readily apparent that the fan will shortly fail, such as where the fan starts emitting a grinding or squealing sound. At least one prior art method exists to predict fan wear out and impending fan failure. This prior art method uses current sensing or voltage sensing circuitry to measure fan input energy and then compares the sensed energy input with a predetermined energy input requirement for a given fan at a given fan speed. The disadvantage of this prior art method is that it requires additional hardware, at an additional cost. The additional hardware required is a power measurement circuit to measure current or voltage input to determine the fan input energy.

Accordingly, what is needed in the art is an apparatus and method to determine fan wear-out and impending fan failure that does not require additional hardware.

SUMMARY OF THE INVENTION

To address the above-discussed deficiencies of the prior art, the present invention provides an apparatus for predicting fan wear-out and impending failure and a method of manufacturing the same. One embodiment includes (1) a lookup table of expected fan speeds at given duty cycles; and (2) a processor for comparing a measured fan speed at a given duty cycle with an expected fan speed at the given duty cycle, the processor generating a predicted fan wear-out and impending failure based on such comparison.

Also provided for herein is an electronic device that includes an electronic power circuit with an associated cooling fan that includes an apparatus for predicting fan wear-out and impending failure. One embodiment includes (1) a lookup table containing expected fan speeds at given duty cycles; and (2) a processor for comparing a measured fan speed at a given duty cycle with an expected fan speed at such duty cycle, the processor predicting fan wear-out and impending failure based on such comparison.

A method of manufacturing an apparatus for predicting fan wear-out and impending failure is also described herein. In one embodiment, such method includes (1) the provision of a lookup table of expected fan speeds for given duty cycles; and (2) the provision of a processor to compare a measured fan speed at a given duty cycle with an expected fan speed at such given duty cycle, the processor predicting fan wear-out and impending failure based on such comparison.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
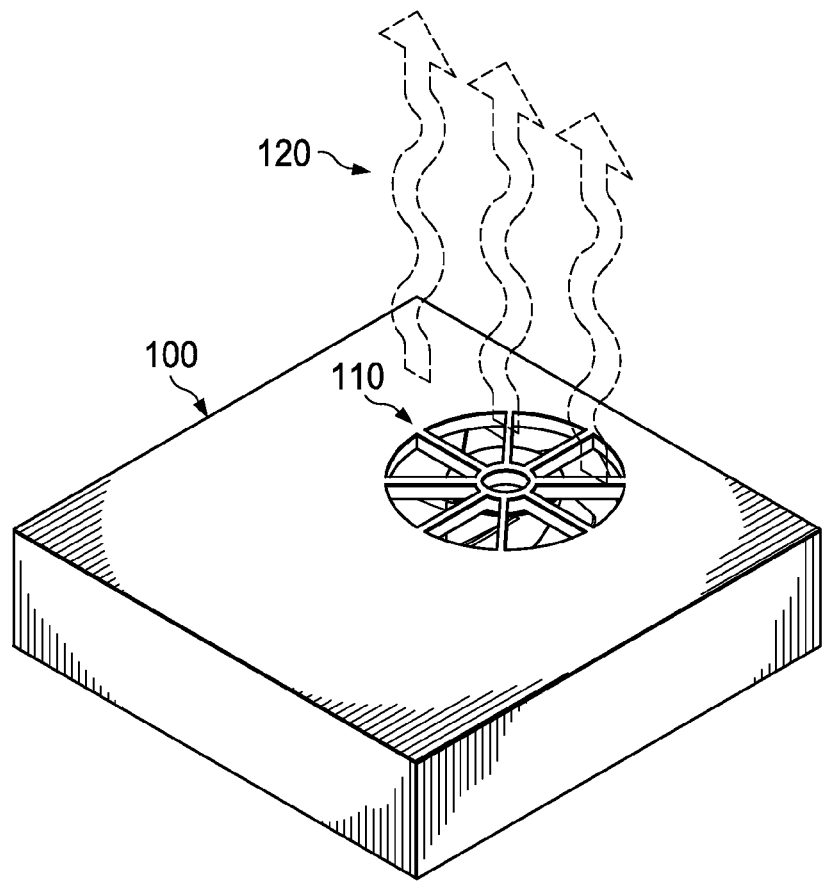
FIG. 1 illustrates an embodiment of an electronic device that uses a fan as a method of addressing the problem of up of component heat build-up.

Referring initially to FIG. 1, illustrated is an embodiment of an electronic device 100 that uses a fan 110 (not shown) as a method of addressing the problem of component heat build-up. Although the present invention can be usefully employed in a number or mechanical devices, such as radiators, generators, etc., its use, as illustrated herein, will be in connection with a fan 110, or fans 110, used for the cooling of electrical or electronic devices 100. Those skilled in the pertinent art will readily understand its usefulness with respect to other applications.

Temperature control is critical for many electronic devices 100, both for continuous operation of the device 100 as well as device 100 longevity. Prolonged or excessive heat build-up shortens not only shortens the life of device 100 components, but the device 100 itself. Consider power converters for example. Power converters are quite ubiquitous and found wherever there is a need to modify the form of electrical energy.

A power converter can range in size from a few milliwatts, such as those used in a mobile phone, to hundreds of megawatts, such as those used in a high voltage transmission system. Because power conversion devices process substantial amounts of electrical energy, in contrast to electronic devices used to transmit and process signals and data, the operation of a power converter will result in heat generation by the power conversion circuit. This heat must be controlled or the device may fail. In the case of smaller power converters, such as that found in mobile phones, temperature may be controlled simply by radiating the heat into the surrounding atmosphere. For larger or more powerful power converters, more aggressive heat control programs must by employed, which means the use of heat control devices such as heat sinks and fans 110.

Most power conversion devices 100 of any size will have at least one fan 110 associated with the power conversion circuit. The fan 110, or fans 110, as the case may be, will generally be structured to distribute heat generated by electronic components into the surrounding atmosphere 120. The fan 110, or fans 110, will frequently be used in conjunction with other heat transfer devices such as heat sinks, but sometimes the fan 110 will be the sole means of heat transfer. As pointed out above, if the fan 110 fails, the device 100 may also fail. The present invention beneficially provides an apparatus for predicting fan 110 wear-out and impending failure, thus, perhaps, saving the device 100 or, at the very least, permitting the device 100 to continue in operation because impending fan 110 failure now becomes an ordinary maintenance item to be addressed before actual failure occurs.

Figure 2:
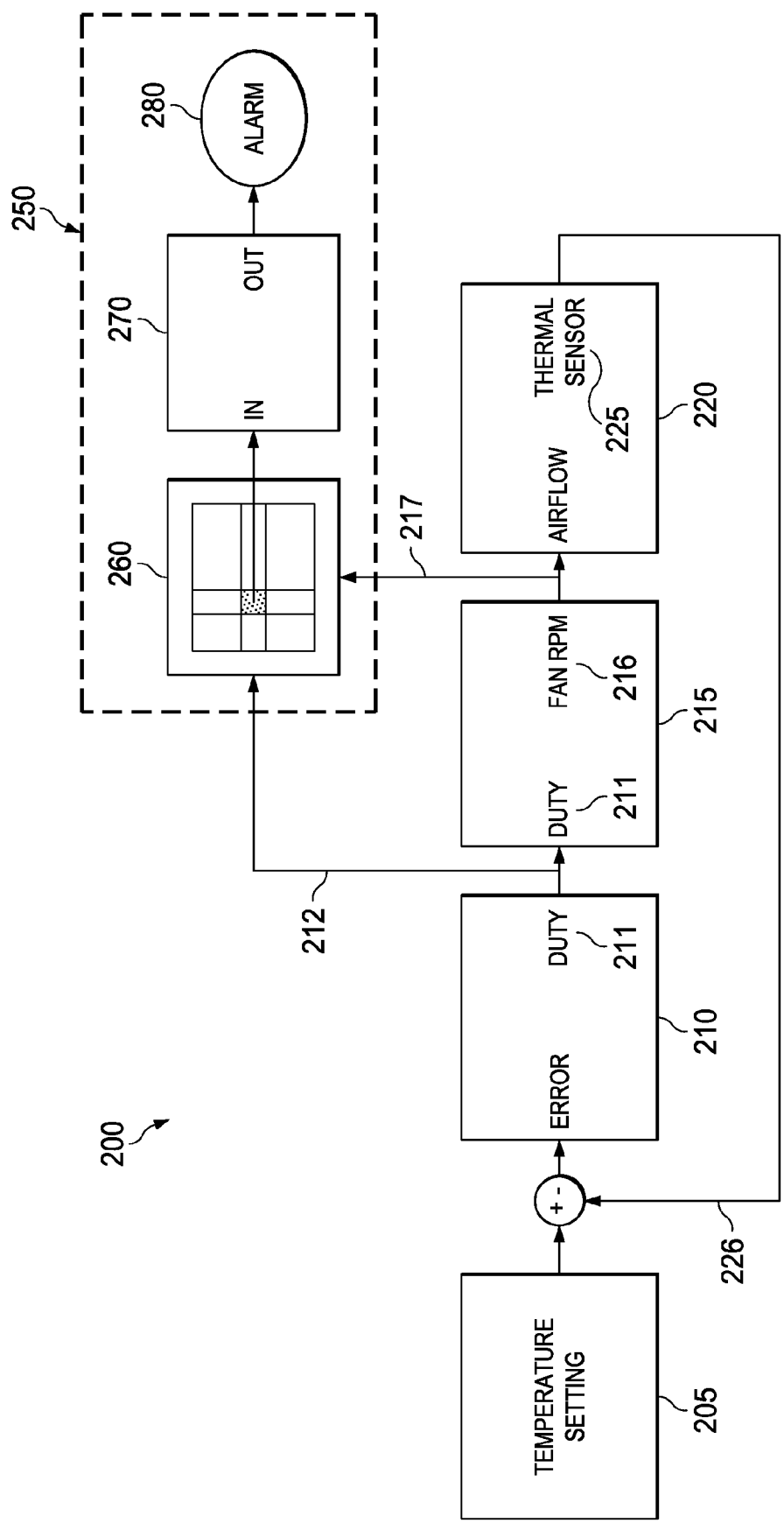
FIG. 2 illustrates a block diagram of a fan operation where the fan includes an apparatus, constructed in accordance with the present invention, to predict fan wear-out and impending failure.

Turning now to FIG. 2, illustrated is a block diagram showing the operation 200 of a fan used to transfer heat from a machine or electronic device, where the fan includes an apparatus 250 device, constructed in accordance with the present invention, to predict fan wear-out and impending failure. Based on the system thermal requirements of the relevant mechanical or electronic device, a temperature setting 205 will be established. Based on the temperature setting 205 and feedback 226 from a thermal sensor (hereinafter described) 225, a fan control 210 will set and regulate the fan duty cycle 211. The fan control 210 also includes a compensator that works to minimize input error to zero. As used herein, the term duty cycle 211 refers to the proportion of time during which the fan is to be operated. The duty cycle 211 as set by the fan control 210 is then input into a fan block 215, which will provide airflow output proportional to the duty cycle 211 input as fan revolutions per minute (rpm) 216. The resultant airflow will be over the system to be cooled, a thermal mass 220, and will transfer heat to the surrounding ambient air. A thermal sensor 225 in the thermal mass 220 detects the temperature and provides feedback 226 to the fan control to use in setting the duty cycle 211.

The operation of the apparatus 250 predicting fan wear-out and impending failure will now be explained. The duty cycle 211 output of the fan control 210 is fed into a lookup table 260 as duty cycle input 212. A fan rpm 216 or fan speed from the fan block 215 is also fed into the lookup table 260 as fan rpm input 217. In one embodiment the fan rpm 216 is measured by a fan tachometer (not shown). The lookup table 260, illustrated in FIG. 3, contains the expected fan speeds, expressed as fan rpm 216, at specified duty cycles 211. Based on the duty cycle input 212, an expected fan speed is determined. A processor 270 then compares measured fan speed as fan rpm input 217 at a given duty cycle input 212 with the expected fan speed for that duty cycle. Based on this comparison, the processor 270 can generate a predicted fan motor failure. The device 250 then generates a fan wear-out prediction and, if wear-out is imminent, an alarm 280 signaling an impending fan failure. The processor 270 can also allow for an intermediate or delayed average fan wear-out alarm 280. This intermediate or delayed average wear-out alarm can be advantageously employed for maintenance purposes to allow the fan to be repaired or replaced before it actually quits. In one embodiment the fan wear-out alarm 280 will warn that the fan is actually worn out or that it has reached an end of life condition. Another embodiment provides for different types of an alarm 280, such as the generation of a status bit, or an alarm bit. The alarm 280 can be an actual alarm signal such as an audible or visual alarm or, in another embodiment, it can be generated as a system display. As will be appreciated by those skilled in the pertinent art, any form of alarm 280 can be used and be within the intended scope of the present invention. In one embodiment of the invention the lookup table 260 and the processor 270 are incorporated into the fan control algorithm. This means that additional hardware circuitry is not required to implement the present invention.

Figure 3:
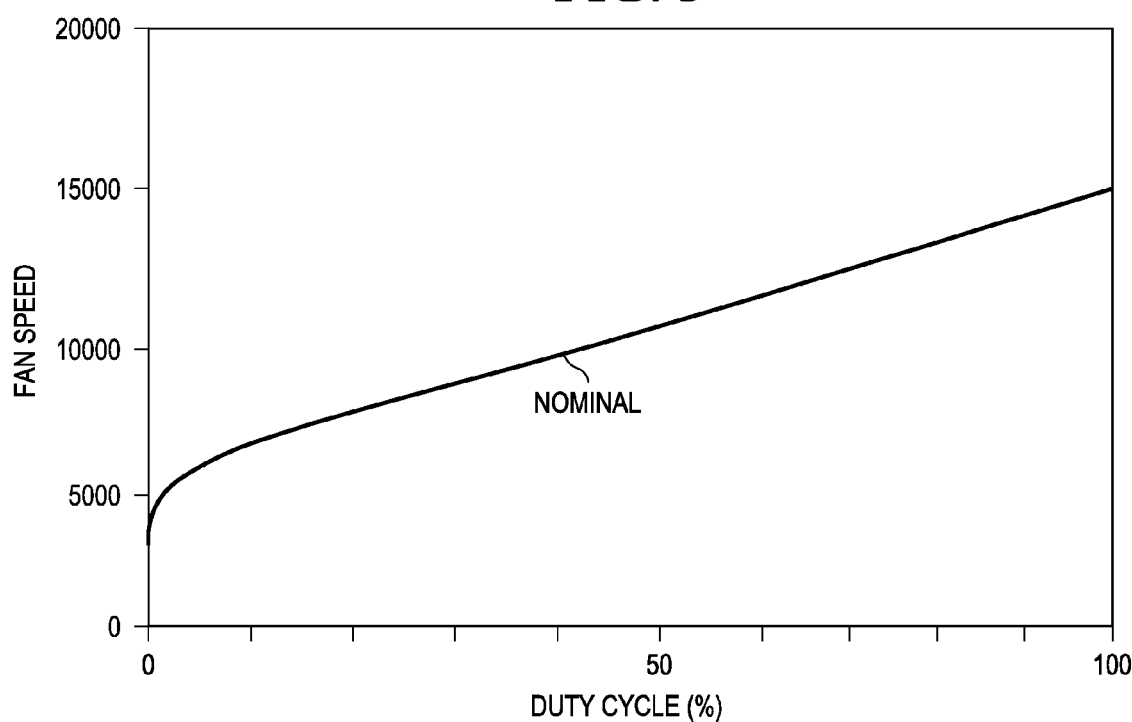
FIG. 3 illustrates a graphical example of a look-up table as used in the present invention.

Turning now to FIG. 3, illustrated is a graphical example of a look-up table 260 as used in the present invention. Of course the actual implementation of the look-up table will most likely be included in the fan control algorithm, as set forth above. As illustrated the look-up table has one axis showing the fan speed expressed in revolutions per minute and the other an expected duty cycle for the fan in question, expressed as a percentage in this example. The look-up table can be provided either by the fan vendor or it can be prepared based on laboratory results.

Although the present invention is illustrated as being beneficially employed with respect to fan cooled power components, those skilled in the pertinent art will understand that it can also be employed with respect to any type of fan, to include fans used as a stand alone device or fans used to cool other devices or machines.

Figure 4:
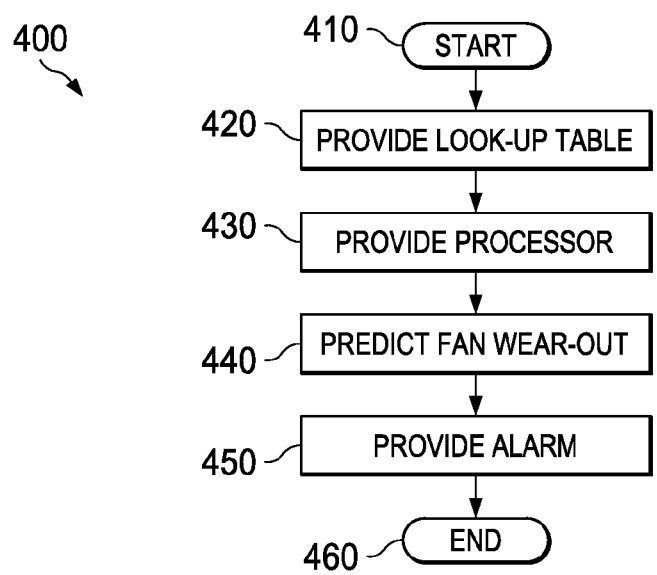
FIG. 4 illustrates a flow chart illustrating a method of manufacturing an apparatus for predicting fan wear-out and impending failure in accordance with the pressing invention.

Turning now to FIG. 4, illustrated is a flow chart illustrating a method 400 of manufacturing an apparatus for predicting fan wear-out and impending failure in accordance with the present invention. The method commences with a start step 410. In a provide look-up table step 420, a look-up table of expected fan speeds at specified duty cycles is provided. As indicated above, this information can be provided either by the fan vendor or it can be prepared based on laboratory results. Also, as indicated above, this information can be incorporated in the fan control algorithm. In a provide processor step 430, a processor is provided to compare measured fan speed at a given duty cycle with an expected fan speed at that given duty cycle. The processor then predicts fan wear-out and impending failure, if such is to occur, based on such comparison in a predict fan failure step 440. Again, the processor may be provided for in the fan control algorithm. In one embodiment, the method provides for an alarm in a provide alarm step 450. As noted above, the alarm may be sounded in a number of different ways, all of which will be familiar to a person skilled in the pertinent art. The method concludes with an end step 460. Other embodiments of methods of manufacturing an apparatus for predicting fan wear-out and impending failure in accordance with the present invention will be readily apparent to those skilled in the pertinent art based on the foregoing disclosure.

Although the present invention has been described in detail, those skilled in the art should understand that they can make various changes, substitutions and alterations herein without departing from the spirit and scope of the invention in its broadest form.

What is claimed is:

1. An apparatus for predicting fan wear-out and impending failure, comprising:

a lookup table of expected fan speeds at given duty cycles, wherein said duty cycles refer to a proportion of time during which said fan is to be operated; and a processor for comparing a measured fan speed at a given duty cycle with an expected fan speed at said given duty cycle, said processor predicting fan wear-out and impending failure based on such comparison.

2. An apparatus for predicting fan wear-out and impending failure as recited in claim 1 wherein said measured fan speed is provided by a fan tachometer.

3. An apparatus for predicting fan wear-out and impending failure as recited in claim 1 wherein said lookup table is included in a fan control algorithm.

4. An apparatus for predicting fan wear-out and impending failure as recited in claim 1 further including a fan wear-out alarm.

5. An apparatus for predicting fan wear-out and impending failure as recited in claim 4 wherein said fan wear-out alarm indicates said fan is approaching end of life conditions.

6. An apparatus for predicting fan wear-out and impending failure as recited in claim 4 wherein said fan wear-out alarm is selected from the group consisting of:
an alarm bit;
an audible alarm signal; and
a visual alarm signal.

7. An apparatus for predicting fan wear-out and impending failure as recited in claim 4 wherein said fan wear-out alarm is configured to provide either an immediate or a delayed alarm signal.

8. An electronic device, comprising:
an electronic power circuit; and
a fan associated with said electronic power circuit, said fan including an apparatus for predicting fan wear-out and impending failure, said apparatus including:
a lookup table of expected fan speeds at given duty cycles, wherein said duty cycles refer to a proportion of time during which said fan is to be operated; and
a processor for comparing a measured fan speed at a given duty cycle with an expected fan speed at said given duty cycle, said processor predicting fan wear-out and impending failure based on such comparison.

9. An electronic device as recited in claim 8 wherein said measured fan speed is provided by a fan tachometer.

10. An electronic device as recited in claim 8 wherein said lookup table is included in a fan control algorithm.

11. An electronic device as recited in claim 8 further including a fan wear-out alarm.

12. An electronic device as recited in claim 11 wherein said fan wear-out alarm indicates said fan is approaching end of life conditions.

13. An electronic device as recited in claim 11 wherein said fan wear-out alarm is selected from the group consisting of:
an alarm bit;
an audible alarm signal; and
a visual alarm signal.

14. An electronic device as recited in claim 11 wherein said fan wear-out alarm can be configured to provide either an immediate or a delayed alarm signal.

15. A method for predicting fan wear-out and impending failure, comprising:
providing, by a processor, a lookup table of expected fan speeds at given duty cycles, wherein
said duty cycles refer to a proportion of time during which said fan is to be operated; and
comparing, by said processor, a measured fan speed at a given duty cycle with an expected fan speed at said given duty cycle, said processor predicting fan wear-out and impending failure based on such comparison.

16. A method as recited in claim 15 wherein said measured fan speed is provided by a fan tachometer.

17. A method as recited in claim 15 wherein said lookup table is included in a fan control algorithm.

18. A method as recited in claim 15 further including a fan wear-out alarm.

19. A method as recited in claim 18 wherein said fan wear-out alarm indicates said fan is approaching end of life conditions.

20. A method as recited in claim 18 wherein said fan wear-out alarm is selected from the group consisting of:
an alarm bit;
an audible alarm signal; and
a visual alarm signal.

* * * * *